L. BOZIK.
FURNITURE CASTER.
APPLICATION FILED MAR. 22, 1921.
1,391,363. Patented Sept. 20, 1921.
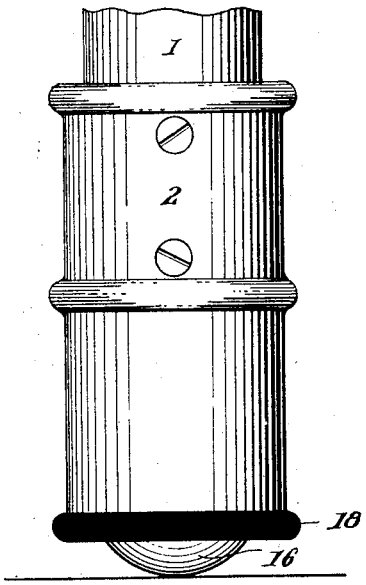
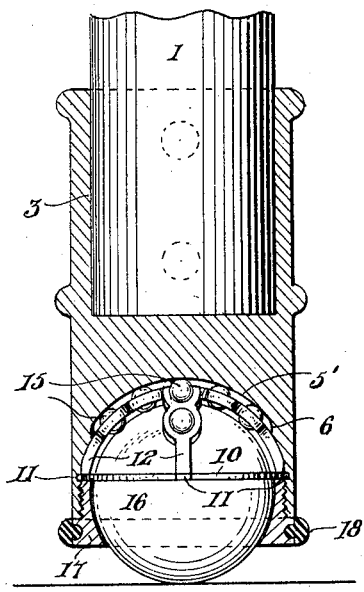
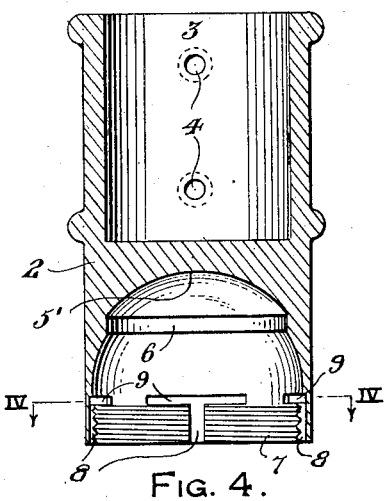
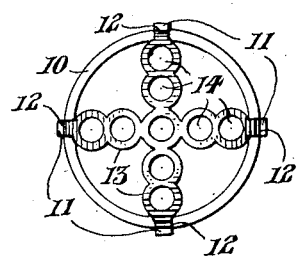
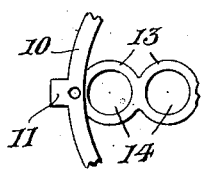
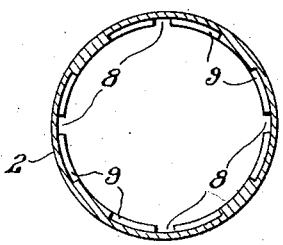
Inventor
L. Bozik
By J. K. Bryant
Attorney

UNITED STATES PATENT OFFICE.

LUKAS BOZIK, OF LIVINGSTON, ILLINOIS.

FURNITURE-CASTER.

1,391,363.  Specification of Letters Patent.  Patented Sept. 20, 1921.

Application filed March 22, 1921. Serial No. 454,597.

*To all whom it may concern:*

Be it known that I, LUKAS BOZIK, a citizen of Czecho-Slovakia, residing at Livingston, in the county of Madison and State of Illinois, have invented certain new and useful Improvements in Furniture-Casters, of which the following is a specification.

This invention relates to certain new and useful improvements in furniture casters, and has particular reference to the foot structure for the supporting legs of furniture wherein a relatively large ball caster is confined within a socket with a cage and anti-friction bearing balls interposed between the caster ball and the wall of the socket.

The primary object of the invention resides in the provision of a ball caster for furniture wherein a ball bearing cage is removably positioned within a socket of a caster casting, the cage being interlocked with the casting with a caster ball retained within the casting and in engagement with the bearing balls within the cage.

With these general objects in view and others that will appear as the nature of the invention is better understood, the same consists in the novel construction, combination, and arrangement of parts hereinafter more fully described, illustrated in the accompanying drawing, and pointed out in the appended claim.

In the drawing forming a part of this application and in which like designating characters refer to corresponding parts throughout the several views, Figure 1 is a side elevational view of a furniture caster constructed in accordance with the present invention, the attaching leg therefor being broken away, Fig. 2 is a vertical sectional view showing the ball bearing cage within the body of the caster and the caster ball extending into the ball bearing cage, Fig. 3 is a vertical sectional view of the caster body or casting with the caster ball and anti-friction ball bearings removed showing the entrance guide slots for the ball bearing frame, Fig. 4 is a horizontal sectional view taken on line IV—IV of Fig. 3, Fig. 5 is a top plan view of the ball bearing frame and Fig. 6 is a fragmentary bottom plan view of the ball bearing frame.

The caster disclosed in this application is serviceable for attachment to any type of furniture, a furniture leg being indicated by the reference numeral 1 having the caster body 2 with a socket 3 in the upper end thereof receiving the lower end of the furniture leg 1, fastening screws passing through side openings 4 in the body of the caster to retain the caster on the leg. The detail construction of the caster body 2 is shown more clearly in Figs. 2 to 4, the same embodying a transverse partition 5 upon the upper wall of which the lower end of the furniture leg 1 rests, the lower end of the body 2 being socketed as illustrated while the bottom wall of the partition 5 is upwardly arched as at 5' with the edges thereof merging into the side walls of the caster body 2. The bottom wall of the partition 5 has a perpendicular flat wall portion 6 at points spaced from the side walls of the body portion 2 for purposes presently to appear. The lower end of the body portion 2 of the caster is internally threaded as at 7 with T-shaped grooves formed in the inner wall, the vertical portions 8 of the grooves extending through the threads 7 while the cross heads 9 of the T-shaped grooves are formed of the inner ends of the threaded portion of this construction being clearly shown in Figs. 4 and 3.

An anti-friction ball bearing cage is disposed within the lower end of the caster 2 and embodies an annular band or ring 10 carrying radial lugs 11 and an arched form of spider embodying radial arms 12 carried by the ring with circular enlargements 13 provided with central openings 14 to receive anti-friction balls 15. In placing the anti-friction ball bearing frame within the caster 2 the lugs 11 are positioned in the vertical grooves 8 with the entire frame moved inwardly of the caster body 2 until the lugs 11 are received in the horizontal or annular head grooves 9, whereupon the frame is partially rotated in either direction to cause the frame to be retained within the caster body as shown in Fig. 2.

A relatively large ball caster 16 is positioned in the lower open end of the caster body 2 and retained in position by the threaded ring 17 having a curved inner wall extending below the horizontal diameter of the caster ball 16 with the ring threaded into the lower threaded end of the caster body. A buffer band 18 is carried by the lower peripheral edge of the ring 17 so that the caster body will not injure other articles of furniture when contacted thereby.

From the above detailed description of the invention it is thought that the construction and operation thereof will at once be apparent it being noted that the anti-friction balls 15 are interposed between the bottom wall of the partition 5 and the caster ball 16, the anti-friction balls being retained in position by the spider arms 12 with the anti-friction ball supporting frame interlocked with the caster body. The radial arms 12 of the caster frame engage the inner wall of the caster body below the flattened wall portion 6 while the arched portion 5' of the partition wall provides the bearing surface for the anti-friction balls 15. Should it be desired to remove the caster for repairing the same or other purposes, the ring 17 is unscrewed from the body of the caster 2 to permit the caster ball 16 to be removed and the anti-friction bearing ball carrying frame may then be partially rotated to cause the lugs 11 to register with the portions 8 of the T-shaped grooves for sliding removal therefrom.

Having described my invention, what I claim as new and desire to secure by Letters Patent is:—

A furniture caster of the type described comprising a caster body having sockets at the upper and lower ends thereof, an anti-friction bearing ball supporting frame positioned within the lower socket and interlocked with the walls thereof, a caster ball extending into said socket and frame, a ring threaded into the end of the lower socket for retaining the caster ball in position, said bearing ball supporting frame including an annular band, an arched spider-shaped frame carried by said band and having ball-receiving openings therein, and radial lugs carried by said band, the inner face of the lower socket having T-shaped grooves therein into which the band lugs are received for retaining the bearing ball frame within the caster body.

In testimony whereof I affix my signature in presence of two witnesses.

LUKAS BOZIK.

Witnesses:
 JOHN CAMEALY,
 JOHN STANO.